INVENTOR.
RICHARD R. STRACK

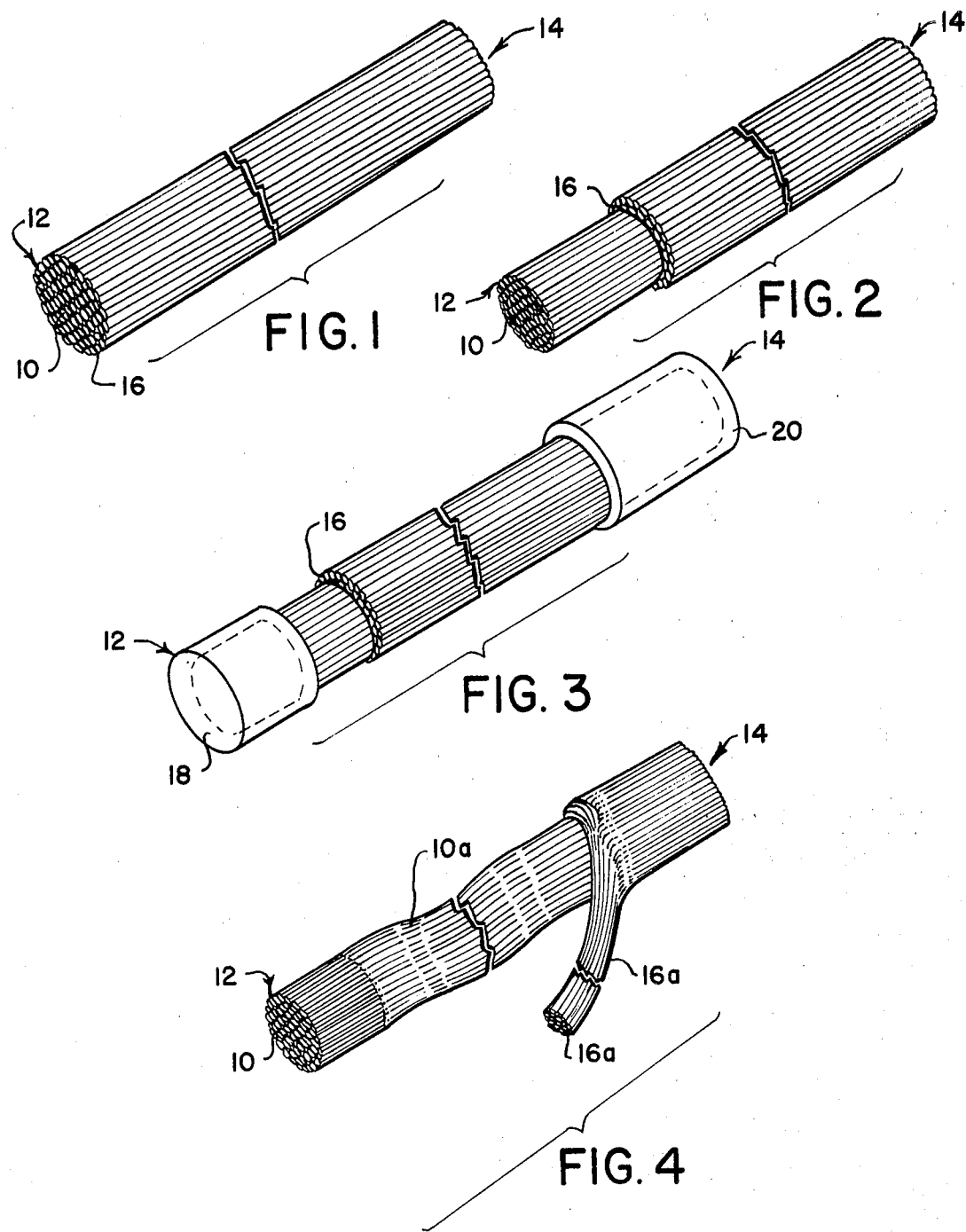

United States Patent Office 3,674,452
Patented July 4, 1972

3,674,452
METHOD OF FABRICATING ILLUMINATED FIBER OPTICS
Richard R. Strack, Sturbridge, Mass., assignor to American Optical Corporation, Southbridge, Mass.
Filed June 25, 1970, Ser. No. 49,876
Int. Cl. C03c 23/20, 15/00
U.S. Cl. 65—4
9 Claims

ABSTRACT OF THE DISCLOSURE

Illuminated image transporting fiber optics are fabricated by first forming a coherent bundle of optical fibers, the ends of the bundle being arranged in identical geometrical patterns and bound together with an acid leachable silica-free glass. A thickness of fibers is removed from one end of the coherent bundle whereupon remaining fibers at that end and the entire opposite end of the bundle are sealed with an acid resistant cover. The intermediate uncovered parts of the bundle are leached to simultaneously free corresponding intermediate lengths of the fibers and ends of the fibers of said partially removed thickness thereof. The resulting free ends of the partially removed thickness of fibers are gathered into a bundle whereby light applied thereto provides illumination at the opposite end of the coherent bundle.

---

Fiber optics are formed by fabricating bundles of relatively small, light-conducting filaments or fibers. Image transporting fiber optics are made by having the fibers coherent, that is with the two ends of a bundle in identical geometrical patterns. Flexible fiber optics are formed by having the ends of the bundle bonded together in predetermined pattern with intermediate lengths of the fibers free to flex independently of each other.

The fabrication of fiber optics, and particularly fiberscopes of the flexible type, has heretofore been difficult, and quite expensive with resulting devices in general not being completely practical for all purposes. For example, fiberscopes produced in accordance with United States Patent No. 3,004,368 patented Oct. 7, 1961, wherein coherent bundles bound together by borosilicate glasses are left with a granular residue between the fibers after leaching with acid. This residue being, for all practical purposes, impossible to completely remove from the transitional areas between the fused together and separated section of the fibers, causes abrasion and breakage of the fibers during use of the fiberscope thereby rendering it inferior.

It, therefore, is a primary object of the present invention to provide an improved method of producing improved fiber optical devices.

An additional object of the invention is to provide a novel method for forming an illuminated coherent bundle of fiber optics, particularly having substantially identical geometrically patterned fixed ends and flexible intermediate sections, with a branched illuminating bundle secured to one end of the fiber optic.

Another object of the invention is to provide a high quality leached fiberscope using a bondable material which is a silica-free glass.

Still another object of the invention is to provide a novel method for fabrication of flexible fiberscopes having attached to one end branched, light-conducting noncoherent fibers.

These and other objects and advantages of the invention may be readily ascertained by referring to the following description and appended illustrations in which;

FIG. 1 is a perspective view of a bundle of coherent optical fibers illustrating one step in the fabrication of a device according to the invention;

FIG. 2 is a perspective view of the device of FIG. 1 with an outer thickness of the bundle cut away at one end thereof according to another step in the fabrication of a device according to the invention;

FIG. 3 is a perspective view of the bundle with coated ends ready for leaching according to a further fabrication step;

FIG. 4 is a perspective view of the optical fibers in leached condition with ends of fibers of the outer thickness of the bundle separated from the remaining portion of the bundle;

DESCRIPTION OF THE PREFERRED EMBODIMENTS

Figure 5:
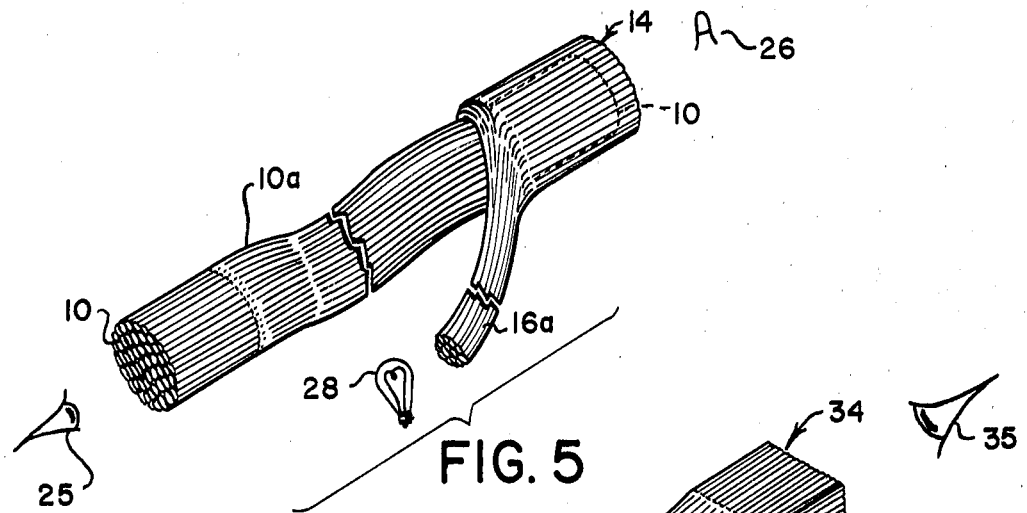
FIG. 5 is a generally schematic view of use of a fiberscope formed according to the invention.

The results of the steps of the method of the invention are illustrated in FIGS. 1 through 4, and the method involves initially fabricating a fiber optical conduit, wherein a plurality of light-conducting fibers 10 formed in a bundle with a predetermined geometrical configuration at end 12 and an identical geometrical configuration at end 14. With the image-transmitting fibers in the same relative position, the bundle provides an accurate reproduction of an image transferred from one end through the device to the other end. The bundle of optical fibers are bonded or fused together throughout their lengths in the bundle with a silica-free acid soluble matrix glass, which has a softening temperature and expansion coefficient that is compatible with the usual optical fiber glasses. One example of the bonding glass is a borate glass containing about 45% $B_2O_3$, about 45% BaO and about 8% $La_2O_3$, with the percentages on a weight basis. Other silica-free glasses may be used if they have a softening temperature and an expansion coefficient which is compatible with the optical glass.

The next step in the operation is to machine away a thickness of outermost fibers 16 adjacent end 12 of the bundle, shortening fibers 16 as shown in FIG. 2. This machining may be done with standard optical shop glass working equipment. It is followed by the step of applying an acid resistant coating or covering 18 over at least a part of remaining portion 17 of the end 12 of the bundle and a similar coating 20 over the opposite non-machined end 14 of the bundle. These covers prevent acid leaching of glass fiber bonding material at both ends of the bundle. The acid resistance coating may be a synthetic plastic, paraffin or the like.

With the ends completely masked, the bundle is then immersed in acid and the glass bonding material is leached from its intermediate non-coated portions. For example, the silica-free leachable glass may be removed by immersing the unit in hydrochloric acid, which leaches the silica-free glass from the fibers; the coated ends, however, remain bonded by the silica-free glass, with image-transmitting fibers in position, so that the identical predetermined geometrical pattern of the coherent fibers in the optical conduit is retained at both ends. With the leaching of the silica-free glass from the intermediate portion of the fiber bundle, fibers 16 may be turned to the side of the bundle as shown in FIG. 4 at 16a. Intermediate lengths of the fibers of the image transporting section of the bundle are loosened when the acid leaches the silica-free glass from them, as shown at 10a in FIG. 4. Thus the bundle is rendered flexible along the major portion of its length and peripheral fibers 16 are rendered free to be turned to the side of the bundle as just described and grouped together as shown at 16a in FIG. 4. There is no granular residue between the fibers and, accordingly, there is no interference with foreign matter during flexing of the image transporting conduit.

One use of the image transporting conduit is illustrated in FIG. 5, wherein an eye 25 represents viewing an image produced at end 12 of optical conduit by transmission through the fibers 10 from an image of an object A produced upon end 14 of the conduit. The object is illuminated by an electric lamp 28, with light transmitted therefrom through the group of outermost fibers 16a and emitted from the end 14 of the conduit as a halo or ring of light encircling the image conducting fibers 10. The free ends of fibers 16a may be sheathed in a housing with lamp 28.

In U.S. Pat. No. 3,004,368, above-mentioned, fiber optical devices are described and the manufacture of the devices are, also, described. In that patent, borosilicate glass is used as a bonding agent for the optical fibers. The borosilicate glass is only partially soluble in hydrochloric acid and, accordingly, a silica residue is left between the fibers. A washing procedure is suggested in that patent and a similar type of washing procedure may be used with the present process, using a silica-free bonding glass. However, when leaching with acid, all of the silica-free bonding glass is leached away from unprotected parts, providing a superior fiberscope. The bonding glass material should have a coefficient of expansion and a softening temperature which is compatible with the usual fiber glasses used for image transmission. Useful types of glasses are high index flint glass for cores of the fibers and relative low index crown glass surrounding the flint glass as cladding which renders the fibers individually highly internally reflective to light.

Other configurations of the fiber optical conduits and the light-transmitting fiber cladding may be fabricated according to the invention.

Figure 6:
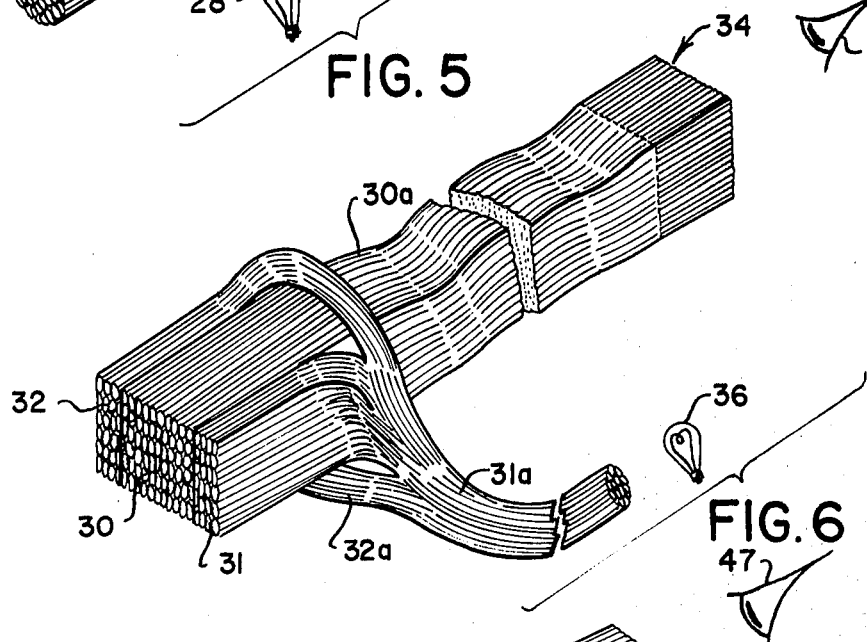
FIG. 6 is a perspective, generally schematic view of a modified form of fiberscope made according to the invention.

In FIG. 6, a retangular fiberscope, either oblong or square in cross-section, is fabricated of a coherent bundle of optical fibers 30 fused together with a silica-free matrix glass and having extra light-transmitting fibers 31 and 32 on each side thereof. The fabrication is the same as for the circular fiberscope. Silica-free glass is used to bond all of the fibers together. One end 34 of the fiberscope has the extra fibers 31 and 32 removed, similar to the arrangement of FIG. 2, whereupon both end masked with the acid resistant covers. On acid leaching of the silica-free glass from all of the bundle except for the masked ends, fibers 31a and 32a become freed whereupon they are gathered into a light-transmitting bundle. Fibers 30a intermediately of their fixed opposite ends permit the bundle to flex. An eye 35 indicates the sighting of images transported through the coherent bundle, and an electric lamp 36 provides illumination through fibers 31a and 32a to the image-receiving end of the fiberscope. This illumination is on opposite sides of the optical image-transmitting fibers 30.

Figure 7:
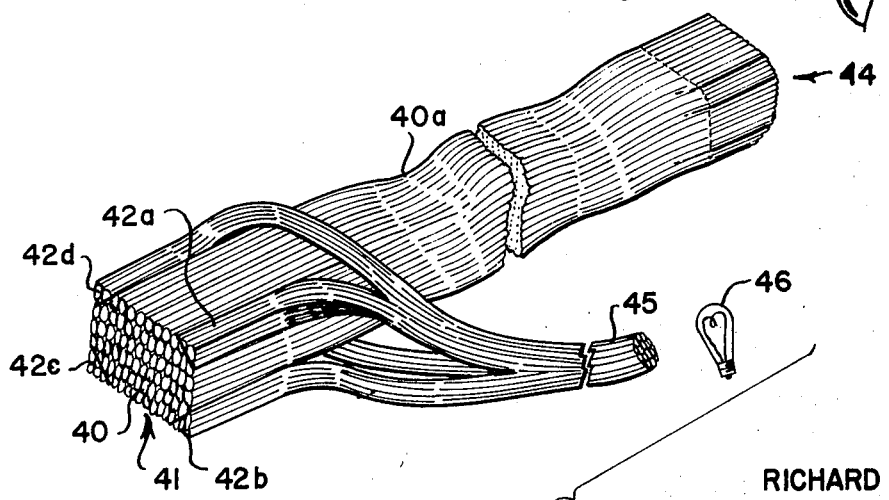
FIG. 7 is a generally schematic illustration of another modified form of fiberscope made according to the invention.

The configuration of FIG. 7 includes an octagonal optical fiber conduit 40 with the fibers at each end in a predetermined geometrical pattern, particularly with the ends in identical pattern. The bundle end 41 is provided with illumination in the corners by bundles 42a, 42b, 42c and 42d. The bundles are initially bonded with silica-free glass, and fabrication is similar to that set out for FIGS. 1-4. The masking covers are placed over the end 41 and over the machined opposite end 44, and the matrix or bonding silica-free glass is then acid leached from the unmasked portion of the image transporting bundle as well as from the illuminating bundle 42a-42d. The resulting free ends of bundles 42a-42d are turned from the conduit and gathered into a bundle 45 at its side. An electric lamp 46 provides illumination at all four corners of the end 41 of conduit 40. Free flexing of lengths 40a of the image transporting fibers permit the conduit to flex. Eye 47 represents the sighting of images transported to end 44 of the conduit.

While not shown, the image transmitting conduit and the illuminating fibers may be enclosed in suitable housings, as known in the art. The type of housing, size of the bundles, their lengths, etc. is determined by the use to which a particular unit is to be put.

What is claimed:

1. A method of fabricating a branched fiber optic viewing device adapted to conduct light to objects to be viewed thereby through one branch of the device and simultaneously transport images of the illuminated objects to a remote viewing location through another branch of the device; the method comprising:

positioning a multiplicity of light-transmitting optical fibers in parallel side-by-side relationship with each other as a bundle having opposite ends of said fibers disposed in identical geometrical patterns at corresponding opposite ends of the bundle, said fibers each having an outer cladding of silica-free acid soluble glass;

fusing said fibers together along the full length of the bundle;

cutting back a preselected number of outermost fibers of said bundle adjacent one end of the bundle to shorten said number of outermost fibers and expose cutback ends thereof intermediately of the length of the bundle;

covering the ends of remaining fibers at said one end of said bundle with an acid-resistant coating material and also covering the entire opposite end of said bundle with an acid-resistant coating material;

immersing said bundle in an acid-solvent for said outer claddings to leach said silica-free glass away from all uncovered portions of all fibers to render each fiber independently flexible and to free said exposed cutback ends of the outermost fibers from each other and from adjacent other fibers of said bundle; and gathering said free cutback ends of said outermost fibers together as a group adjacent one side of remaining fibers of said bundle whereby said gathered together outermost fibers comprise said one branch of said device for receiving and conducting light to objects intended for viewing by said branched fiber optic viewing device.

2. A method according to claim 1 wherein said number of outermost fibers extend about the entire periphery of said bundle.

3. A method according to claim 2 wherein said coherent bundle is formed in a circular cross-section.

4. A method according to claim 1 wherein said coherent bundle is formed in a rectangular cross-section.

5. A method according to claim 4 wherein said number of outermost fibers are disposed along at least two opposed sides of said rectangular bundle.

6. A method according to claim 4 wherein said number of outermost fibers extend along corners of said bundle.

7. A method according to claim 1 wherein said number of outermost fibers extend from end-to-end of said bundle of coherent fibers, and said cutting back of said outermost fibers is performed into a thickness of said bundle over a predetermined distance back from one end thereof.

8. A method according to claim 1 wherein said silica-free glass is a borate glass.

9. A method according to claim 1 wherein said leaching is characterized by contacting said silica-free glass with hydrochloric acid.

References Cited
UNITED STATES PATENTS

| | | | |
|---|---|---|---|
| 3,554,721 | 1/1971 | Gardner | 65—4 |
| 3,004,368 | 10/1961 | Hicks, Jr. | 65—4 |
| 3,010,357 | 11/1961 | Hirschowitz | 65—LR 7 |
| 3,050,907 | 8/1962 | Hicks, Jr. et al. | 65—LR 7 |
| 3,383,192 | 5/1968 | Seigmund | 65—4 |
| 3,580,775 | 5/1971 | Seigmund | 65—LRD 7 |

FRANK W. MIGA, Primary Examiner

U.S. Cl. X.R.

65—31, Dig. 7; 350—96 B